H. H. BUNZEL.
OXIDASE APPARATUS.
APPLICATION FILED MAY 27, 1912.

1,046,259.

Patented Dec. 3, 1912.

Witnesses
Floyd R Harrison
Charles W. Boyle

Inventor
Herbert H. Bunzel
By McCabe
Attorney

UNITED STATES PATENT OFFICE.

HERBERT H. BUNZEL, OF WASHINGTON, DISTRICT OF COLUMBIA.

OXIDASE APPARATUS.

1,046,259.  Specification of Letters Patent.  Patented Dec. 3, 1912.

Application filed May 27, 1912. Serial No. 700,132.

(DEDICATED TO THE PUBLIC.)

*To all whom it may concern:*

Be it known that I, HERBERT H. BUNZEL, an employee of the Department of Agriculture of the United States of America, residing in the city of Washington, District of Columbia, and whose post-office address is Washington, District of Columbia, have invented a new and useful Improvement in Oxidase Apparatus.

This application is made under the act of March 3, 1883, chapter 143 (22 Stat. 625), and the invention herein described and claimed may be used by the Government of the United States or any of its officers or employees in the prosecution of work for the Government, or any person in the United States, without payment to me of any royalty thereon.

My invention relates to apparatus for use in measuring the oxidase content in plants and animal juices.

The object of my invention is to provide an apparatus by means of which it is possible to measure the gas absorption occurring during chemical reactions. It has the particular advantage of keeping the reacting substances separate, until the reaction is initiated by mixing them within the closed apparatus, and which is particularly adapted for use in analytical work for measuring the quantity of respiratory enzyms in plant juices and plant extracts. It is well known that oxidases play an important role in various agricultural crop diseases. They also play an important part in color changes of plants and in various phenomena observed in connection with agricultural products such as the darkening of tea, the hardening and darkening of the juice of the Japanese lacquer tree, in the pasteurizing of milk, etc.

My apparatus is designed for aiding analysts in measuring accurately the quantity of oxidase content in vegetable and animal juices. By its use scientists are enabled to determine accurately and rapidly *in vitro* whether or not any particular substance is being oxidized by atmospheric oxygen in the presence of blood or any particular animal tissue, whether the pulp of the tissue, its pressed juice or extract is used.

Figure 2:
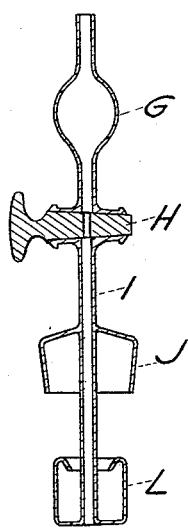
Figure 1:
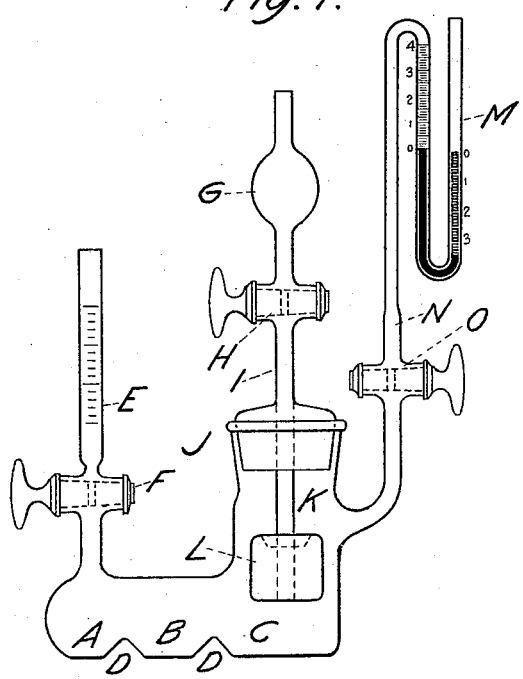

The nature, characteristic features, and scope of my invention will be more readily understood from the following description taken in connection with the accompanying drawing:

Figure 1 is a side perspective view of my oxidase apparatus, and Fig. 2 is a longitudinal section through basket.

As shown in the drawing the bottom of the apparatus, which is constructed of glass, is divided into three compartments, A, B, and C, by indentations, D D. Liquid may be poured into compartment, A, through burette, E, by turning the stopcock, F, on so as to permit an uninterrupted flow. After the required quantity of liquid has entered compartment, A, the stopcock, F, is closed. The compartments, B and C, may be filled out of the bulb, G, which has a volume of about 8 cubic centimeters, through stopcock, H, and tube, I, or said compartments may be filled by removing the tube, I, with the bulb, G, and stopcock, H, by means of the ground joint, J, which connects said tube, I, bulb, G, and stopcock, H, with the flask, K. Tube, I, supports a small glass basket, L, within the main compartment of the flask, K. This basket is provided with a rim around its top to prevent any liquid from splashing out when the apparatus is shaken. It is also sufficiently elevated from the bottom of the flask to prevent any liquid from splashing in.

M represents a manometer graduated to millimeters, from which readings are taken. The manometer, M, is connected with the flask, K, by means of the glass tube extension, N. Said manometer may be disconnected at any time by closing the stopcock, O.

The apparatus is well flattened on the bottom, except where intercepted by indentations, D D, and the same stands firmly. The compartments, A and B, are formed in an extension to the flask, K, and compartment, C, constitutes the bottom of said flask, K.

My apparatus is primarily designed for use in analytical work where it is necessary to subject juices or other substances to agitation until the maximum oxygen absorption is reached. The indentations, D D, are intended to separate the juices which are to be tested from the analytical solutions or material required to be mingled with the juices during the test until the shaking process is begun.

Having thus described my invention, I claim:

In an oxidase apparatus, comprising a flask having an integral extension, said extension having double indentations separating the lower portion of said device into three compartments, A, B, and C, a burette arranged at one end of said extension for admitting liquid to compartment, A, a stopcock for interrupting the flow of liquid through said burette, a bulb, G, and tube, I, for supplying liquid to compartments B and C, a stopcock, H, for interrupting the flow of liquid through said tube, said tube, I, connected with said flask by means of a ground joint, a basket provided with a rim at its top supported in said flask by tube I, a manometer connected with said flask and a stopcock, O, for disconnecting said manometer, which said apparatus is adapted for use in analytical work, substantially as specified.

In testimony whereof, I affix my signature in the presence of two subscribing witnesses.

HERBERT H. BUNZEL.

Witnesses:
 CARL L. ALSBERG,
 O. F. BLACK.

Copies of this patent may be obtained for five cents each, by addressing the "Commissioner of Patents, Washington, D. C."